United States Patent [19]

Ohsaki

[11] Patent Number: 5,022,578

[45] Date of Patent: Jun. 11, 1991

[54] SHEET FEEDER FOR FEEDING CONTINUOUS PRINT PAPER HAVING SPROCKET HOLES

[75] Inventor: Ryoukei Ohsaki, Tokyo, Japan

[73] Assignee: Oki Electric Industry Co., Ltd., Tokyo, Japan

[21] Appl. No.: 190,677

[22] Filed: May 5, 1988

[30] Foreign Application Priority Data

May 15, 1987 [JP] Japan ................................ 62-71636

[51] Int. Cl.[5] ...................... B65H 20/20; G03B 11/00

[52] U.S. Cl. .................................. 226/74; 400/616.1

[58] Field of Search .......................... 226/74, 75, 170; 400/616, 616.1, 616.2; 474/101, 113, 114

[56] References Cited

U.S. PATENT DOCUMENTS 3,825,162 7/1974 Hubbard .............................. 226/74
3,978,693 9/1976 Worst ............................ 474/138 X
4,129,239 12/1978 Hubbard .............................. 226/75
4,159,794 7/1979 Seitz ..................................... 226/75
4,194,660 3/1980 Seitz ..................................... 226/74
4,199,091 4/1980 Hubbard .............................. 226/74
4,372,440 2/1983 Ringus ........................... 474/113 X
4,611,737 9/1986 Hubbard et al. ...................... 226/74
4,723,697 2/1988 Tano et al. ........................... 226/74
4,773,579 9/1988 Umuma ................................ 226/74
4,789,088 12/1988 Unama et al. ........................ 226/74

FOREIGN PATENT DOCUMENTS 2125008 1/1973 Fed. Rep. of Germany ......... 226/74

*Primary Examiner*—Daniel P. Stodola
*Assistant Examiner*—Paul Thomas Bowen
*Attorney, Agent, or Firm*—Wenderoth, Lind & Ponack

[57] ABSTRACT

A sheet feeder for feeding continuous printing paper having sprocket holes includes a pair of frames, a drive gear and a guide gear interposed therebetween, and a pin tractor belt extending between the drive gear and the guide gear. The drive gear and the guide gear respectively have flanges at the both ends thereof for tightly holding the pin tractor belt. A guide roller is interposed between the drive gear and the guide gear and is rotatably supported by one of the frames. The pin tractor belt smoothly travels over the guide roller. The pin tractor belt has a plurality of pins provided at an upper surface thereof to be engaged with sprocket holes of continuous printing paper for feeding the continuous printing paper. Inasmuch as the upper surface of the pin tractor belt projects above the upper surfaces of the frames, the continuous printing paper is fed without contacting the frames.

8 Claims, 3 Drawing Sheets

SHEET FEEDER FOR FEEDING CONTINUOUS PRINT PAPER HAVING SPROCKET HOLES

BACKGROUND OF THE INVENTION

1. Field of the Invention

The present invention relates to a sheet feeder for feeding continuous printing paper having sprocket holes.

2. Description of the Prior Art

A sheet feeder is employed in a printer such as a serial printer which uses continuous printing paper having sprocket holes (hereafter referred to as paper). A conventional sheet feeder is disclosed in U.S. Pat. No. 4,194,660 issued Mar. 25, 1980 in the name of Seitz and U.S. Pat. No. 4,199,091 issued Apr. 22, 1980 in the name of Hubbard.

The invention of U.S. Pat. No. 4,199,091 includes a pair of frames opposed to each other, a drive gear rotatably mounted between a pair of frames, and a pin tractor belt extended between the drive gear and a hub. The pin tractor belt has a plurality of pins to be engaged with the sprocket holes of the paper at the outer circumferential surface of the pin tractor belt, and teeth to be engaged with the drive gear at the inner circumferential surface thereof.

A cover is openably provided on one of the frames for preventing the sprocket holes of the paper from deviating from the pins.

In such a conventional sheet feeder, a line of teeth provided on the inner circumferential surface of the pin tractor belt is moved with the drive gear and the hub so that the pin tractor belt is rotated.

However, according to the conventional sheet feeder, the pin tractor belt is rotated with the line of teeth in contact with flanges of the frame. At the same time, sides of the pin tractor belt contact the inside surfaces of the frames. To smoothly rotate the pin tractor belt, the pin tractor belt extends loosely between the hub and the drive gear and a gap or play is provided between the inside surfaces of the frames and the pin tractor belt.

To effect a graphic print, the sheet feeder is required to stop with a high degree of accuracy. However, the sheet feeder can only be stopped with a low degree of accuracy when provided with such a gap or play. An extreme reduction of the gap or play for improving the degree of accuracy sharply increases the friction between the pin tractor belt and the frame and between the pin tractor belt and the flanges to prevent a smooth rotation of the pin tractor belt and at worst stops the feeding of the paper due to the inability to drive the pin tractor belt.

According to U.S. Pat. No. 4,194,660, a support member is provided at the linear portion of the pin tractor belt instead of an idle wheel provided at the curvilinear portion of the pin tractor belt. The pin tractor belt disclosed in this patent is rotated while the line of teeth contacts the support. At the same time, the pin tractor belt is rotated while the side surfaces of the pin tractor contact the opposite sides of the frames. Accordingly, this feeder has the same drawbacks as the feeder disclosed in U.S. Pat. No. 4,194,660.

In the conventional sheet feeders as disclosed in both U.S. Patents, an upper circumferential surface at the belt is flush with the upper surface of the frames. The paper supported on the flush surfaces of the pin tractor belt and the frames is fed by the rotation of the pin tractor belt. However, inasmuch as the paper contacts the upper surface of the frames, a smooth rotation of the pin tractor belt is prevented.

SUMMARY OF THE INVENTION

The present invention has been made to solve the drawbacks of the conventional sheet feeders.

It is therefore an object of the present invention to provide a sheet feeder enabling a stoppage in the feed of paper with a high degree of accuracy.

It is a further object of the present invention to provide a sheet feeder enabling a pin tractor belt to be driven with a low amount of power and subject to a low load.

It is still a further object of the present invention to provide a sheet feeder having a pin tractor belt which can be rotated smoothly by removing friction caused between a line of teeth of the pin tractor belt and a hub or a support member vertically supporting the pin tractor belt.

It is still a further object of the present invention to provide a sheet feeder having a pin tractor belt which can be rotated smoothly by removing friction caused between the side surfaces of the pin tractor belt and the opposite sides of frames for laterally supporting the pin tractor belt.

It is still another object of the present invention to provide a sheet feeder having a pin tractor belt which can be rotated smoothly by preventing paper to be fed from contacting upper surfaces of the frames.

To achieve the objects of the present invention, a sheet feeder comprises a pair of oppositely disposed frames, drive gears and a guide gear respectively provided with flanges at the sides thereof and respectively rotatably interposed between the pair of frames, and a pin tractor belt extending between the drive gear and the guide gear. The arrangement prevents the sides of the pin tractor belt from contacting the frames. A guide roller is rotatably provided in contact with a line of teeth of the pin tractor belt between the drive gear and the guide gear for supporting the pin tractor belt so that the pin tractor belt is smoothly rotated. The outer circumferential surface of the pin tractor belt on which the paper is supported is slightly above the upper surfaces of the frames to prevent the paper from contacting the upper surfaces of the frames so that the pin tractor belt can rotate smoothly.

The above and other objects, features and advantages of the present invention will become more apparent from the following description taken in conjunction with the accompanying drawings.

BRIEF DESCRIPTION OF THE DRAWINGS

FIG. 4 (*b*) is a cross-sectional view taken along line B—B' of FIG. 3.

DETAILED DESCRIPTION OF THE PREFERRED EMBODIMENT

Figure 1:
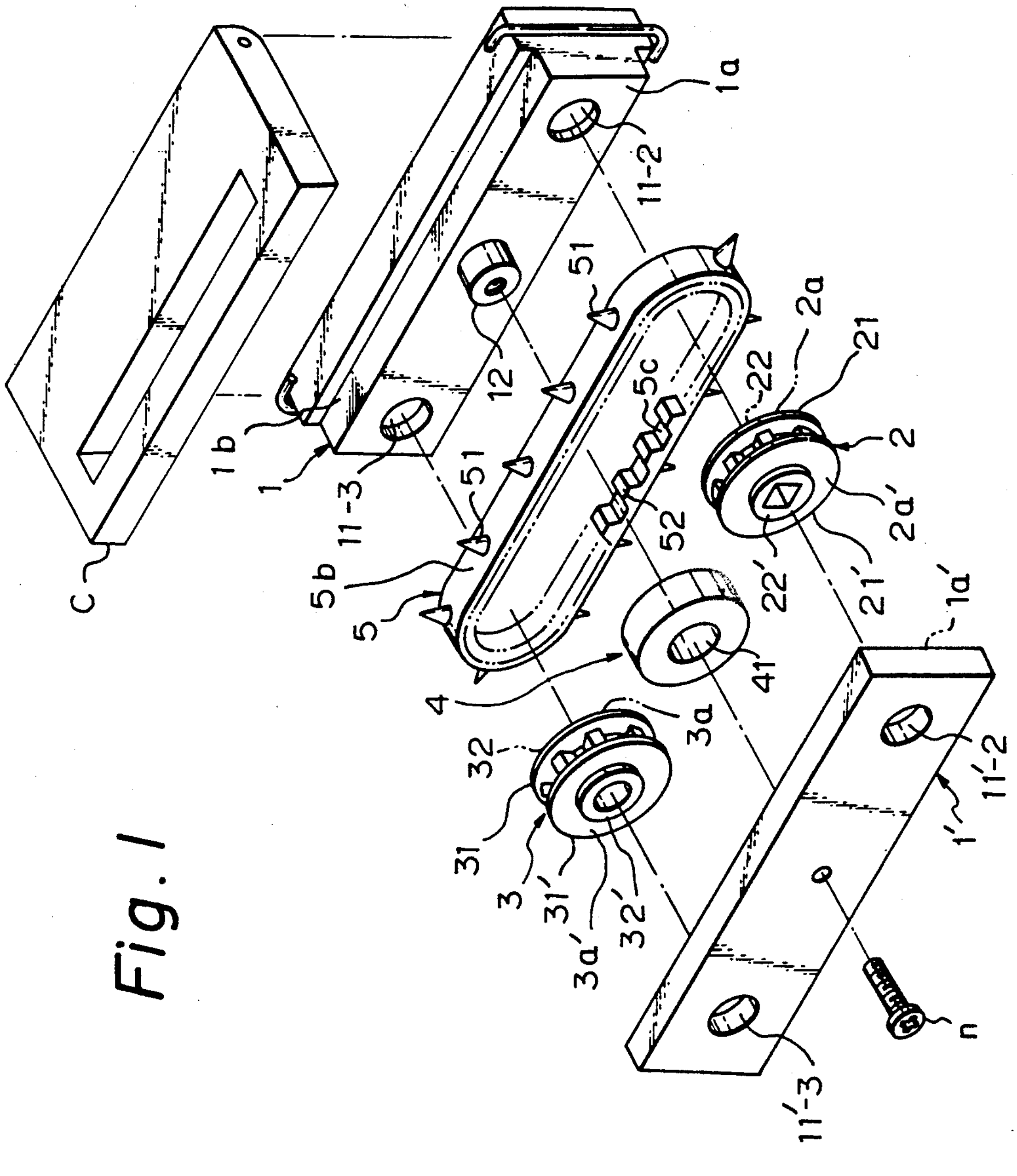
FIG. 1 is an exploded perspective view of a sheet feeder according to the preferred embodiment of the present invention.
Figure 2:
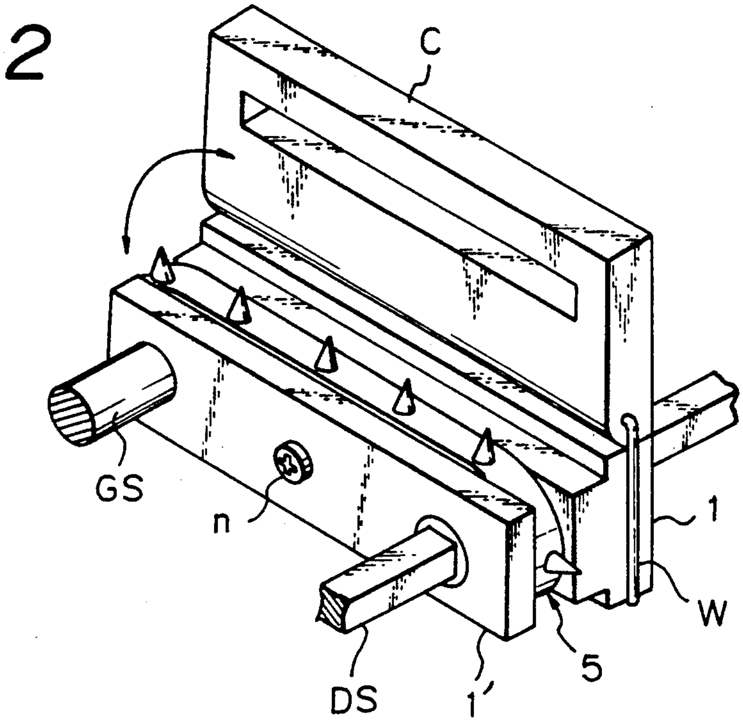
FIG. 2 is a perspective view of the sheet feeder of FIG. 1.

A sheet feeder according to the preferred embodiment of the present invention will be described with reference to FIGS. 1 and 2.

Figure 3:
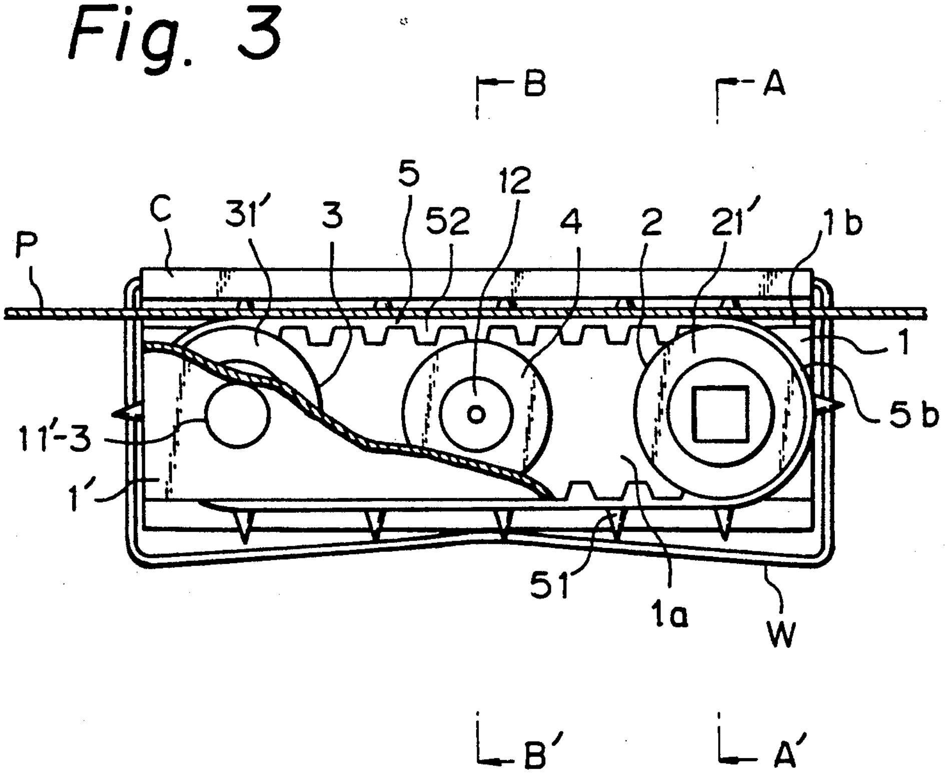
FIG. 3 is a broken-away front elevational view of a sheet feeder according to the present invention.

The sheet feeder comprises a pair of frames 1, 1' having respective throughholes 11-2, 11-3, 11'-2, 11'-3 extending through the side surfaces thereof, a drive gear 2 having ends *2a*, *2a'*, flanges 21, 21', and a shaft supporter 22, 22' for receiving a drive shaft DS, a guide gear 3 having ends *3a*, *3a'*, flanges 31, 31', and shaft supporter 32, 32' for receiving a guide shaft GS, a guide roller 4 having a hollow portion 41 through which a cylindrical projection 12 provided at a central portion of the frame 1 is loosely inserted and positioned between the drive gear 2 and the guide gear 3 to contact an endless pin tractor belt 5 preventing the pin tractor belt 5 from vibrating vertically, and the endless pin tractor belt 5 having a plurality of pins 51 provided at an outer circumferential surface *5b* for engaging sprocket holes Pa of a paper P (FIGS. 4A, 4B) and a line of teeth 52 provided at an inner circumferential surface *5c* for engaging the drive gear 2 and the guide gear 3. The pair of frames 1, 1', between which the drive gear 2, the guide gear 3, and the guide roller 4 are interposed are fixed to each other by screwing a screw n penetrating the frame 1' to the cylindrical projection 12. A cover C may be openably (in the direction of the arrow in FIG. 2) provided with use of a wire spring W on an upper surface of one of the frames (frame 1 in the present embodiment) for preventing the paper P (FIGS. 3A, 3B) from running off the pins 51. A rotative force is applied externally to the drive gear 2 via the drive shaft DS to cause the pin tracter belt 5 to travel. An operation of the sheet feeder according to the present invention will be described with reference to FIGS. 3 and 4.

Figure 4A:
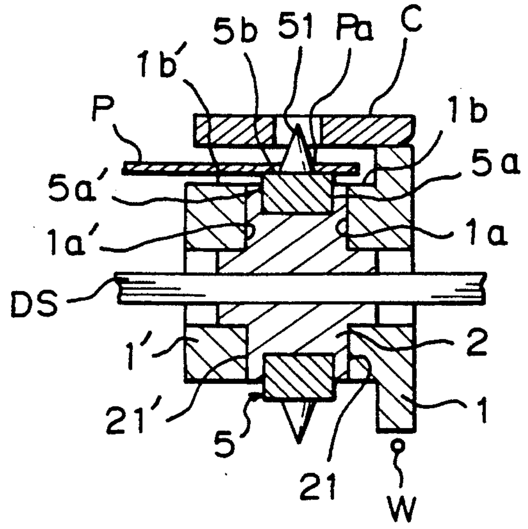
FIG. 4 (*a*) is a cross-sectional view taken along line A—A' of FIG. 3.
Figure 4B:
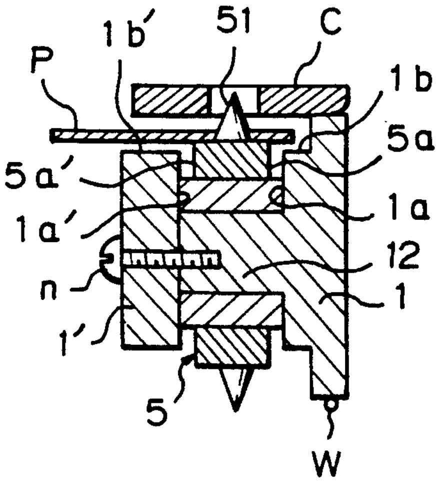

The sides *5a*, *5a'* of the pin tractor belt 5 are tightly held by the flanges 21, 21' of the drive gear 2 and the flanges 31, 31' of the guide gear 3 as shown in FIG. 4(A). The drive gear 2 and the guide gear 3 are respectively tightly held by the frames 1, 1' as shown in FIGS. 4(A), 4(B). Hence the sides of the pin tractor belt 5 do not contact the opposite inner surfaces of the frames 1, 1'.

The guide roller 4 supports the line of teeth 52 of the pin tractor belt 5. The guide roller 4 is rotatable about the cylindrical projection 12 whereby the pin tractor belt 5 can be rotated smoothly without causing friction between the line of teeth and the guide roller. The pin tractor belt 5 is extends between the drive gear 2 and the guide gear 3, and the outer circumferential surface *5b* of the pin tractor belt on which the paper P is supported projects above the upper surfaces 1*b*, 1*b'* of the frames 1, 1' due to the sizes of the drive gear 2, the guide gear 3 and the guide roller 4. Accordingly, the paper P is fed smoothly without contacting the upper surfaces 1*b*, 1*b'* of the frames 1, 1'. That is, the paper P can be fed without contacting any portion except the pin tractor belt 5.

As mentioned above, the sheet feeder according to the present invention includes a pin tractor belt extending between the rotatable drive gear and guide gear and moved without contacting with the frames 1, 1' minimum friction. Accordingly, the pin tractor belt extends without being loose between the drive gear and the guide gear and there is no play between the frames.

Furthermore, the paper can be fed without contacting the upper surface of the frames so that the pin tractor can be rotated with reduced friction.

As a result, it is possible to feed the paper with high accuracy, low power and under a low load.

Although the invention has been described in its preferred form with a certain degree of particularity, it is to be understood that many variation and changes are possible in the invention without departing from the scope thereof.

What is claimed is:

1. A sheet feeder for feeding continuous printing paper having sprocket holes, said feeder comprising:

a pair of opposed frames having securing means for securing the frames to one another, said securing means including a projection extending from one of said frames toward the other of said frames, and each of said frames having an upper surface extending along the entire length thereof;

a drive gear rotatably supported between said pair of frames for being driven;

a guide gear rotatably supported between said pair of frames and spaced from said drive gear;

an endless pin tractor belt extending around said drive and said guide gears so as to have an upper run and a lower run, said endless pin tractor belt also having an outer circumferential surface, a plurality of pins extending from the outer circumferential surface for engaging continuous printing paper in sprocket holes thereof, an inner circumferential surface, and a series of teeth extending from the inner circumferential surface and sequentially engaged by said drive gear as said drive gear is driven to drive said pin tractor belt;

a guide roller disposed between said drive gear and said guide gear, interposed between said upper and said lower runs of said pin tractor belt, rotatably supported on said projection, and having an outer circumferential surface contacting the teeth of said pin tractor belt for being rotated by said pin tractor belt to facilitate smooth rotation of said pin tractor belt around said drive and said guide gears, said guide roller consisting of a roller having a constant outer diameter as taken along the entire axial length thereof, said drive gear, said guide gear and said guide roller supporting said tractor pin belt with the outer circumferential surface at said upper run thereof disposed in a plane lying above the entire said upper surfaces of said pair of frames, wherein when printing paper is supported by said pin tractor belt on the outer circumferential surface at the upper run thereof, the paper is out of contact with said frames; and a cover for covering the upper surfaces of said frames, and a wire spring connected to said cover for openably supporting said cover on one of said frames, said wire spring including a central portion and a pair of ends bent from said central portion and engaging said cover, said central portion having a bend at the middle thereof and engaging a lowest surface of said one of said frames for urging the cover against an uppermost surface of said one of said frames.

2. A sheet feeder as claimed in claim 1, wherein said drive gear has a pair of opposed flanges between which said pin tractor belt extends, said flanges contacting said frames, respectively.

3. A sheet feeder as claimed in claim 2, wherein said guide gear has a pair of opposed flanges between which said pin tractor belt extends, the flanges of said guide gear contacting said frames, respectively.

4. A sheet feeder as claimed in claim 1, wherein said guide gear has a pair of opposed flanges between which said pin tractor belt extends, the flanges of said guide gear contacting said frames, respectively.

5. A sheet feeder for feeding continuous printing paper having sprocket holes, said feeder comprising:

a pair of opposed frames, each of said frames having an upper surface extending along the entire length thereof;

a drive gear rotatably supported between said pair of frames for being driven;

a guide gear rotatably supported between said pair of frames and spaced from said drive gear;

an endless pin tractor belt extending around said drive and said guide gears so as to have an upper run and a lower run, said endless pin tractor belt also having an outer circumferential surface, a plurality of pins extending from the outer circumferential surface for engaging continuous printing paper in sprocket holes thereof, an inner circumferential surface, and a series of teeth extending from the inner circumferential surface and sequentially engaged by said drive gear as said drive gear is driven to drive said pin tractor belt;

a guide roller disposed between said drive gear and said guide gear, interposed between said upper and said lower runs of said pin tractor belt, rotatably supported by at least one of said frames, and having an outer circumferential surface contacting the teeth of said pin tractor belt for being rotated by said pin tractor belt to facilitate smooth rotation of said pin tractor belt around said drive and said guide gears, said guide roller consisting of a roller having a constant outer diameter as taken along the entire axial length thereof, said drive gear, said guide gear and said guide roller supporting said tractor pin belt with the outer circumferential surface at said upper run thereof disposed in a plane lying above the entire said upper surfaces of said pair of frames, wherein when printing paper is supported by said pin tractor belt on the outer circumferential surface at the upper run thereof, the paper is out of contact with said frames; and a cover for covering the upper surfaces of said frames, and a wire spring connected to said cover for openably supporting said cover on one of said frames, said wire spring including a central portion and a pair of ends bent from said central portion and engaging said cover, said central portion having a bend at the middle thereof and engaging a lowest surface of said one of said frames for urging the cover against an uppermost surface of said one of said frames.

6. A sheet feeder as claimed in claim 5, wherein said drive gear has a pair of opposed flanges between which said pin tractor belt extends, said flanges contacting said frames, respectively.

7. A sheet feeder as claimed in claim 6, wherein said guide gear has a pair of opposed flanges between which said pin tractor belt extends, the flanges of said guide gear contacting said frames, respectively.

8. A sheet feeder as claimed in claim 5, wherein said guide gear has a pair of opposed flanges between which said pin tractor belt extends, the flanges of said guide gear contacting said frames, respectively.

* * * * *